US011391860B2

(12) United States Patent
Hou

(10) Patent No.: US 11,391,860 B2
(45) Date of Patent: Jul. 19, 2022

(54) ANISOTROPIC FORMATION MODELING

(71) Applicant: Halliburton Energy Services, Inc., Houston, TX (US)

(72) Inventor: Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 177 days.

(21) Appl. No.: 16/639,803

(22) PCT Filed: May 16, 2019

(86) PCT No.: PCT/US2019/032734
§ 371 (c)(1),
(2) Date: Feb. 18, 2020

(87) PCT Pub. No.: WO2020/231447
PCT Pub. Date: Nov. 19, 2020

(65) Prior Publication Data
US 2022/0003890 A1    Jan. 6, 2022

(51) Int. Cl.
*G01V 3/38* (2006.01)
*G01V 3/28* (2006.01)
*G01V 99/00* (2009.01)

(52) U.S. Cl.
CPC .......... *G01V 3/38* (2013.01); *G01V 3/28* (2013.01); *G01V 99/005* (2013.01)

(58) Field of Classification Search
CPC ... G01V 3/38; G01V 3/28; G01V 3/18; G01V 3/00; G01V 99/005; G01V 99/00
See application file for complete search history.

(56) References Cited

U.S. PATENT DOCUMENTS

| 5,656,930 A | * | 8/1997 | Hagiwara | G01V 3/28 |
| | | | | 324/338 |
| 6,470,274 B1 | * | 10/2002 | Mollison | G01V 11/00 |
| | | | | 702/7 |
| 8,378,684 B2 | | 2/2013 | Minh et al. | |
| 10,768,336 B2 | * | 9/2020 | Ewe | G01V 3/28 |
| 2010/0326669 A1 | | 12/2010 | Zhu et al. | |

(Continued)

OTHER PUBLICATIONS

Onovughe et al. "Saturation Modelling: Using The Waxman-Smits Model/Equation In Saturation Determination in Dispersed Shaly Sands", Jun. 2016, Journal of Multidisciplinary Engineering Science and Technology (JMEST), Pages (Year: 2016).*

(Continued)

*Primary Examiner* — Mohamed Charioui
(74) *Attorney, Agent, or Firm* — DeLizio, Peacock, Lewin & Guerra

(57) ABSTRACT

Systems and methods for determining formation properties are disclosed. In some embodiments, a multi-component induction tool is utilized to measure a set of triaxial resistivities at each of a plurality of borehole depths. Differences among the sets of triaxial resistivities are correlated with a compaction-dependent property determined for one or more borehole depths. Depth-dependent laminate resistivity models are generated based on the correlating. A formation property is determined by processing the sets of triaxial resistivities using a formation tensor model that incorporates the depth-dependent laminate resistivity models.

20 Claims, 6 Drawing Sheets

(56) References Cited

U.S. PATENT DOCUMENTS

2016/0313468 A1    10/2016  Du et al.
2018/0172874 A1*    6/2018  Hou ..................... G01V 11/002
2019/0079209 A1     3/2019  Aldred

OTHER PUBLICATIONS

Rodriguez et al. "Laminated Shaly Sand Reservoirs—An interpretation Model Incorporating New Measurements", Jun. 2-5, 2002, SPWLA 43rd Annual Logging Symposium (Year: 2002).*
PCT Application Serial No. PCT/US2019/032734, International Search Report, dated Feb. 14, 2020, 3 pages.
PCT Application Serial No. PCT/US2019/032734, International Written Opinion, dated Feb. 14, 2020, 7 pages.

* cited by examiner

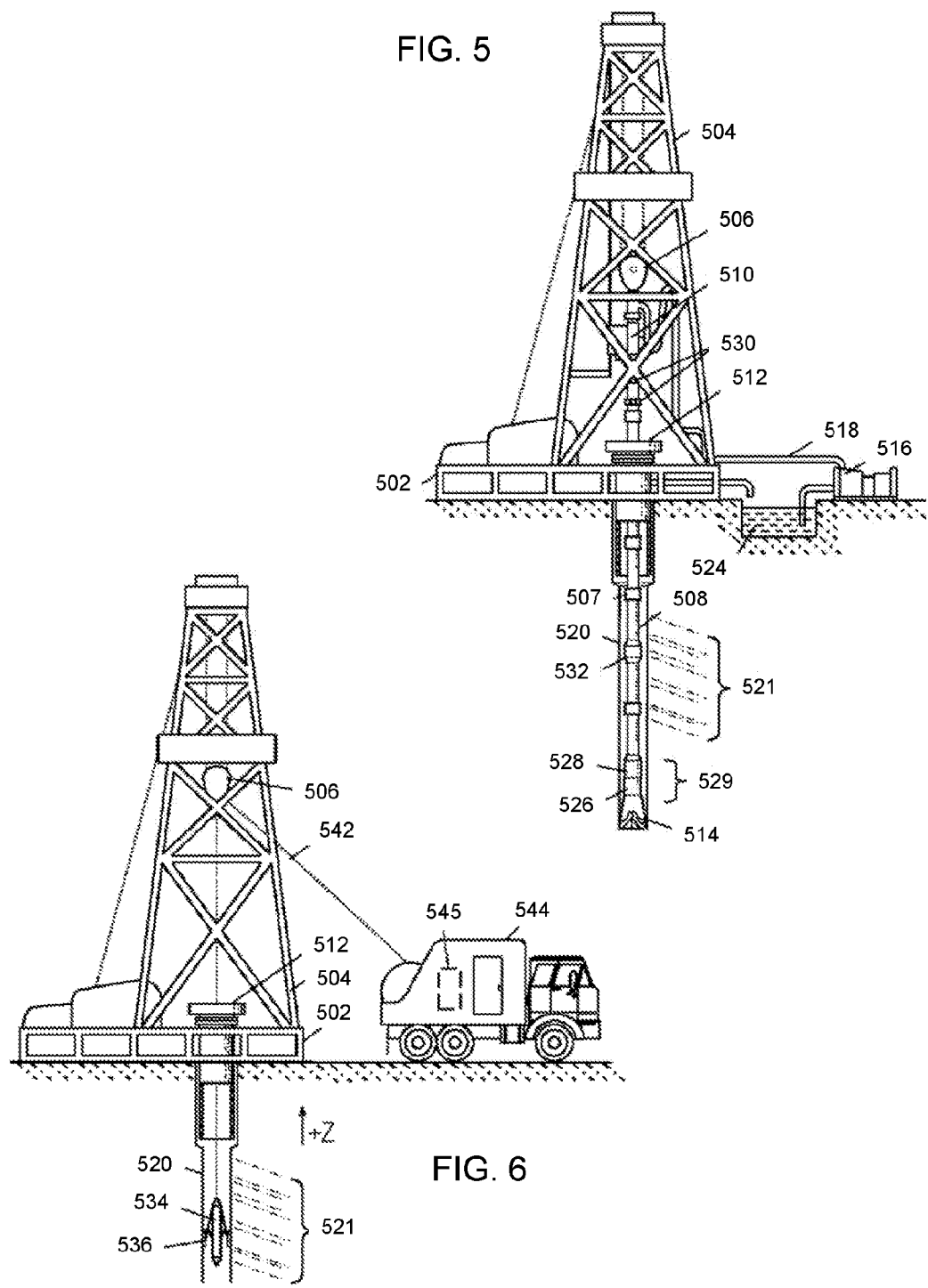

ANISOTROPIC FORMATION MODELING

TECHNICAL FIELD

The disclosure generally relates to the field of underground formation evaluation and, in particular, to using resistivity logging measurements to determine petrophysical properties of formations.

BACKGROUND

Resistivity logging measurements and logging tools are used to determine the electrical resistivity of rock formations surrounding a borehole. The resistivity information is utilized to determine the presence or absence of hydrocarbons in formations. A resistivity logging tool often includes a transmitter antenna and multiple receiver antennas located at different distances from the transmitter antenna along the longitudinal axis (parallel with borehole) of the tool. The transmitter antenna generates electromagnetic fields in the surrounding formation. The electromagnetic fields induce a voltage in the receiver antennas that, due to geometric spreading and absorption by the surrounding earth formation, have different phases and amplitudes. The phase difference and amplitude ratio of the induced voltages in the receiver antennas indicate formation resistivity at a given depth of measurement within the borehole in which the tool is adjacent a particular formation layer.

Many formations are electrically anisotropic, a property which is often caused by very fine layering during the sedimentary build-up of the formation. In a formation coordinate system oriented such that the x-y plane is parallel to the formation layers and the z axis is perpendicular to the formation layers, resistivities $L$ and $R_y$ in directions x and y, respectively, may be relatively uniform and constant, while resistivity $R_z$ in the z direction varies in different azimuthal directions. In this manner, the resistivity in a direction parallel to the plane of the formation (i.e., the x-y plane) may be considered the horizontal resistivity, $R_h$, and the resistivity in the direction perpendicular to the plane of the formation (i.e., the z direction) considered the vertical resistivity, $R_v$.

The presence and positioning of shale in a formation may cause horizontal as well as vertical resistivity anisotropy due to the material heterogeneity in the vertical direction and cracks encountered in the horizontal measurement direction. Shale may be present in the form of laminae between which are layers of sandstone. The effect of shale layers on resistivity logs is a significant factor in determining hydrocarbon saturation estimates.

BRIEF DESCRIPTION OF THE DRAWINGS

Embodiments of the disclosure may be better understood by referencing the accompanying drawings.

FIG. 5 depicts an example logging while drilling (LWD) system configured to determine formation properties in accordance with some embodiments;

FIG. 6 depicts an example wireline (WL) system configured to determine formation properties in accordance with some embodiments.

DESCRIPTION OF EMBODIMENTS

Figure 1:
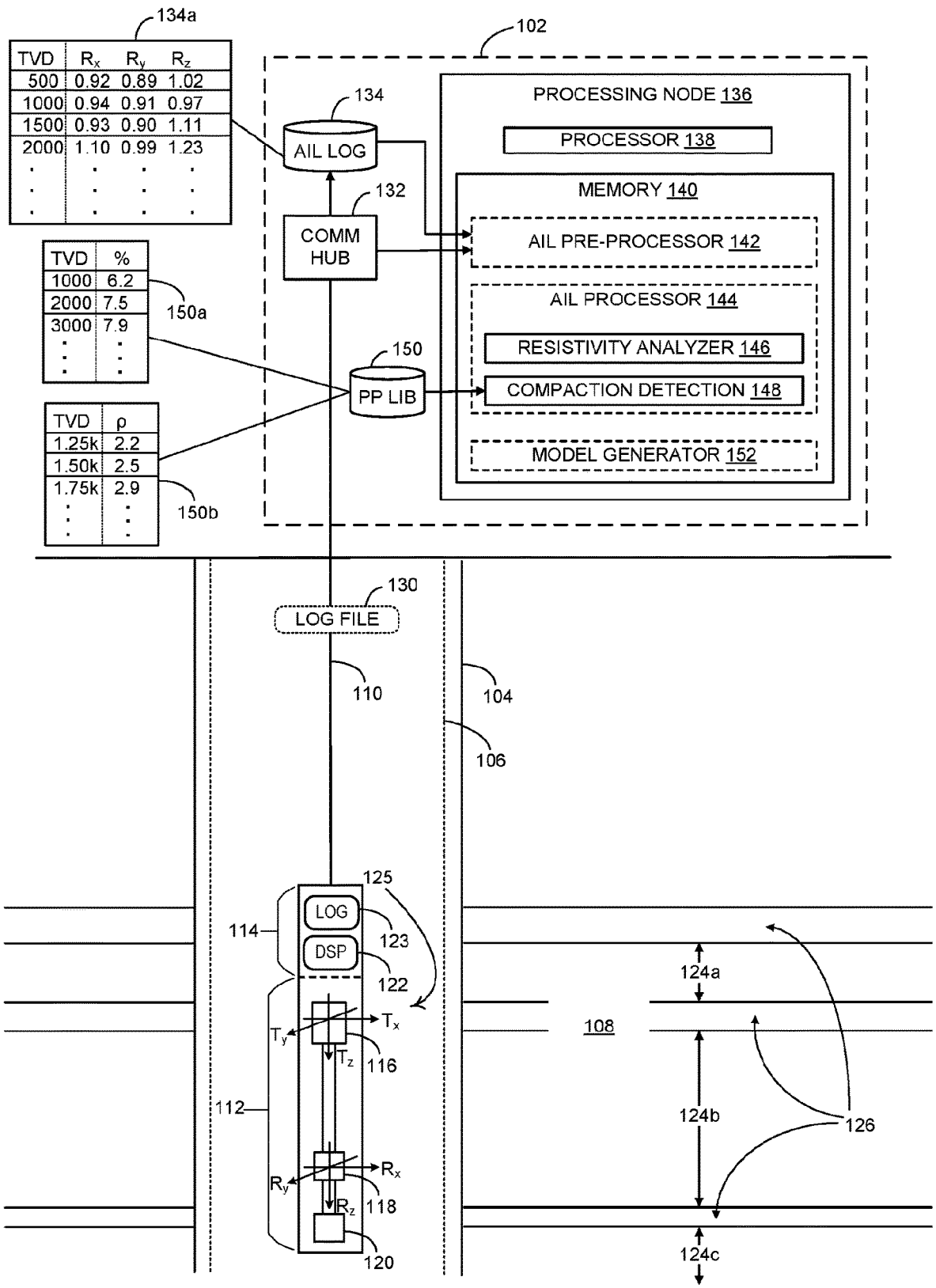
FIG. 1 is a block diagram depicting a formation modeling system implemented within a borehole test system in accordance with some embodiments.

The description that follows includes example systems, methods, techniques, and program flows that embody embodiments of the disclosure. However, the systems, operations, and functions disclosed herein may be practiced without one or more of these specific details. In other instances, well-known instruction instances, protocols, structures and techniques have not been shown in detail in order not to obfuscate the description.

Overview

Systems and techniques disclosed herein include components, operations, and functions for determining formation properties in a manner that accounts for compaction of laminate layers, or laminae. For example, layers of shale may be interleaved or otherwise intermixed among sand formation layers that contain oil liquid or gas concentrations of hydrocarbon compounds. Embodiments include resistivity measurement tools such as multi-component induction (MCI) tools deployed within a borehole and configured to measure sets of triaxial resistivities from adjacent sections of a formation. Triaxial resistivities include at least a horizontal component measured in a plane substantially parallel to the formation layers and a vertical component measured in a direction transverse to the horizontal component plane. The horizontal component comprises two co-planar orthogonal measurement directions described as x-component and y-component both of which may be individually utilized such as in biaxial anisotropy evaluation. For transversely isotropic (TI) type anisotropic modeling, the x and y components are combined into a single horizontal component or they are identical. The vertical component, z, is a measurement component orthonormal to the x and y components plane.

A wireline (WL) and/or logging while drilling (LWD) configuration may be utilized to collect resistivity measurements, such as triaxial resistivity measurements, at multiple borehole depths. The resistivity measurements are initially measured as voltages and inverted and/or otherwise processed to determine resistivity anisotropy in a comprehensive, three-dimensional manner. The resistivity anisotropy may be translated into multi-dimensional formation property anisotropy such as may be caused by heterogeneous material layering in the z-direction of the formation. Anisotropy may also be caused by material structure discontinuities such as fracturing that may extend in any direction including transverse to the horizontal material layers.

Vertical and horizontal resistivity anisotropy data are obtained from real-time and/or post processing or inversions of WL and/or LWD resistivity logging measurements. Petrophysical tensor models are generated and processed using resistivity measurement data as input, for example resistivity data generated from measurements of a resistivity tool such as an MCI resistivity tool. The petrophysical tensor models, also referred to herein as formation tensor models or simply tensor models, process the resistivity data to determine formation material and its structural properties including shale content and sandstone resistivity. The petrophysical tensor models directly or indirectly incorporate one or more depth-dependent laminate resistivity models that are generated for multiple evaluation windows within a range of logging depths. The depth-dependent laminate resistivity models are utilized to process selected portions of the resistivity data from the respective evaluation windows to provide intra-window depth-dependent horizontal and vertical resistivity data, which are ultimately processed by the petrophysical tensor model to determine formation properties. In combination, the tensor models and depth-dependent laminate resistivity models may be applied to more accurately characterize thinly laminated (e.g., shale-sand) formations with low resistivity for determination of reservoir resistivity, laminated shale volume, and oil saturation.

Example Illustrations

FIG. 1 is a block diagram depicting a formation test system in accordance with some embodiments. The formation test system includes a formation modeling system 102 that may be incorporated in part or in whole within the electronics equipment of a well head apparatus (not expressly depicted). Such a well head apparatus may include mechanical, electrical, and electronic systems, subsystems, devices, and components for drilling a borehole 104 and subsequently receiving hydrocarbon fluid from or injecting fluid into a hydrocarbon formation 108. As depicted, hydrocarbon formation 108 comprises multiple distinct, interleaved formation layers including multiple sandstone layers 124a, 124b, and 124c that are separated by multiple shale laminate layers 126.

Formation modeling system 102 includes processing and storage components within a processing node 136 for receiving and processing measured triaxial formation resistivity information. The modeling system components further include a communication hub 132 that enables signal transmission between locally networked components. Communication hub 132 may include routing components configured to enable multi-lateral signal transmission between processing node 136, a resistivity tool 125 (which, in one or more embodiments, can be an MCI tool), and other local components. During resistivity logging, resistivity tool 125 is disposed (e.g., via wireline or LWD) at various depths within borehole 104 while communicatively coupled to communication hub 132 via a telemetry link 110. Telemetry link 110 may comprise components and connectivity media for establishing acoustic, optical, electronic, and/or electromagnetic communications links between resistivity tool 125 and formation modeling system 102.

Resistivity tool 125 can comprises a triaxial logging sonde 112 that includes a three-coil co-located antenna sub-array including a transmitter 116 and a pair of receivers 118 and 120 located at different distances from transmitter 116 along the tool's z-axis. Resistivity tools such as resistivity tool 125 can include the triaxial antenna configuration that enables nine-component EM field measurements in three dimensions. Transmitter 116 includes a triad of three mutually orthogonal transmitter antennas that are conceptually represented in FIG. 1 by three-dimensional axes arrows and that comprise magnetic dipole antennas oriented parallel to the tool's x, y, and z axes. In one or more embodiments, receiver 118 can comprise a receiver triad of three mutually orthogonal bucking receiver antennas, and receiver 120 can comprise three mutually orthogonal main receiver antennas. The triaxial sonde configuration enables measurements of the nine-component tensor of apparent resistivities/conductivities in the rectangular coordinate system at each logging depth: XX, XY, XZ, YY, YX, YZ, ZX, ZY, and ZZ. In the foregoing paired letter designations, each of the first letters indicates the direction of the magnetic moment of the transmitter and each of the second letters indicates the direction of the receiver that detects the component.

The voltages and signal phases measured by receivers 118 and 120 may be translated by inversion computation processes into dimensionally specified resistivity and/or conductivity values. For example, if processed using a transverse isotropic (TI) modeling technique, the measured voltage signal components may be translated to a horizontal resistivity, $R_h$, that represents the x-y plane, and a vertical resistivity, $R_v$, in the z-direction. If processed using a biaxial anisotropy (BA) modeling technique, the measured voltage components are translated into two mutually orthogonal horizontal resistivity components, $R_x$ and $R_y$, and the vertical resistivity component, $R_z$.

Resistivity tool 125 further includes an electronics assembly 114 comprising, in part, a digital signal processor (DSP) 122 configured to process and convert raw measurement signals from receivers 118 and 120 into voltage measurement data. For example, DSP 122 may be configured to determine target metric values (e.g., voltage levels) corresponding to the signal information received directly from receivers 118 and 120. Electronics assembly 114 further includes a log unit 123 that is configured to compute resistivity values from the target metric values determined by DSP 122. The resistivity values may include horizontal and vertical resistivities in the case of TI modeling and/or resistivities in each of the x, y, and z directions if applying BA modeling. In some embodiments, log unit 123 applies an inversion computation to derive the resistivity values from the raw measurement data from DSP 122.

The resistivity data generated by log unit 123 may be recorded by log unit 123 in defined data object structures such as a log file 130. Log file 130 is transmitted from electronics assembly 114 to communication hub 132 from which it may be routed to and recorded in an induction logging library 134. Log file 130 may also or alternatively be provided directly as streamed data or otherwise real-time formatted data to processing node 136. As represented by illustrative records within an induction logging file 134a, log file 130 includes multiple records that each associate a borehole depth (depicted as true vertical depth (TVD)) with the corresponding three-dimensional resistivity measurements collected at the depth. For instance, the third row-wise record within induction logging file 134a associates resistivity measurements $R_x$=0.93, $R_y$=0.90 and $R_z$=1.11 (e.g., ohms-m) with the TVD of 1500 depth units (e.g., meters, feet) at which the measurements were collected.

Processing node 136 is configured, using a combination of hardware and software devices and programmed components, to generate one or more petrophysical tensor models that account for laminate layer compaction. The hardware within processing node 136 incudes a processor 138 configured to execute instructions corresponding to program instructions loaded into an associated memory hardware device 140. The software stored or retrieved by or otherwise accessible for loading into memory 140 includes an array induction logging (AIL) pre-processor component 142, an AIL processor component 144, and a model generator 152. Pre-processor 142 is configured, using any combination of program logic, to remove noise or other faulty results such as in the form of records having resistivity measurements that are outside of pre-specified threshold limits. For instance, pre-processor 142 may be configured to apply low-pass filtering to remove resistivity measurement values that have been distorted by high-frequency noise effects.

The pre-processed results from AIL pre-processor 142 are received by AIL processor 144, which is configured using any combination of program instructions to determine evaluation windows based on compaction of laminate layer boundaries. As shown, AIL processor 144 includes a resistivity analyzer 146 comprising program instructions configured to detect triaxial resistivity differences between and among different measurement depths. In some embodiments, the triaxial resistivity differences are determined by resistivity analyzer 146 based on the differences exceeding a resistance differential threshold. The threshold(s) may be determined based, at least in part, on one or more of a combination of absolute depth, depth differential between resistivity measurements, and difference in triaxial resistivity values between different measurements.

AIL processor 142 further includes a compaction detection unit 148 that is configured using any combination of program instructions to determine compaction effects that may be associated with the differences between the measured triaxial resistivity measurements. Compaction detection unit 148 may determine the compaction effects by correlating differences in the triaxial resistivity measurements with one or more compaction-dependent formation properties determined for depths corresponding to the resistivity measurement depths. As depicted and described in further detail with reference to FIGS. 2 and 4, compaction detection unit 148 receives the depth-associated resistivity measurements as records such as from log library 134 or directly as streamed data in log file 130.

The compaction-dependent material property information may be collected by other measurement components within a logging tool that is disposed in the same wireline or LWD configuration that includes resistivity logging tool 125. Such other measurement components may include a nuclear magnetic resonance (NMR) logging tool that measures formation porosity which may vary based on compaction of laminate layers. The compaction-dependent material property information is collected at multiple depths within wellbore 140 and recorded within records/files within a petrophysical properties library 150. In some embodiments, petrophysical properties library 150 comprises program instructions for receiving and recording in an index retrievable format, NMR porosity information such as within an NMR file 150a. NMR file 150a includes multiple measurement records that associate a measurement depth in terms of TVD, with a measured percent porosity of formation material proximate each respective measurement depth. For instance, the second row-wise record of NMR file 150a associates a measurement TVD of 2000 depth units with formation porosity of 7.5%.

The compaction-dependent properties measurement equipment includes components that may also or alternatively include a gamma ray (GR) logging tool that measures naturally occurring gamma emissions to determine formation elemental composition. The formation composition information can be used to determine regions having high shale or other laminate material content. This information may be used to collect shale samples or otherwise collect shale-specific and depth-associated material information such as shale resistivity information that may also be recorded in petrophysical properties library 150. An induced gamma ray logging tool may be used to determine formation material density that varies based on compaction of laminate layers. The measured density information may also be recorded in petrophysical properties library 150 such as in an induced GR file 150b that includes multiple measurement records that associate a measurement depth in terms of TVD, with a measured density of formation material proximate each respective measurement depth. For instance, the second row-wise record of GR file 150b associates a measurement TVD of 1500 depth units with formation material density of 2.5 density units (e.g., $kg/m^3$).

Compaction detection unit 148 receives the resistivity measurement differences information from resistivity analyzer 146 and compaction-dependent material properties information from petrophysical properties library 150. In some embodiments, compaction detection unit 148 is configured to selectively retrieve compaction-dependent material properties information such as porosity and/or density that is associated with the same measurement depths or range of measurement depths as associated with the resistivity and resistivity difference information. In this manner, compaction detection unit 148 correlates compaction-dependent information from petrophysical properties library 150 with the differences in detected resistivities to identify laminate layers affected by compaction. Compaction detection unit 148 may utilize the laminate layer compaction information to determine a number of evaluation windows that each correspond to a range of depths and which are bounded by resistivity measurement differences and depth-correspondent compaction-dependent material property information.

In some embodiments, compaction detection unit 148 divides a range of borehole depths into evaluation windows each bounded by a start and end point. For instance, each of the evaluation windows may be defined by a start TVD and an end TVD. The evaluation window information is received and processed by a model generator 152 that is configured to generate one or more formation tensor models that account for laminate layer compaction at depth. Model generator 152 is configured using any combination of data and program instructions to process the evaluation window information to generate depth-dependent laminate resistivity models corresponding to each of the evaluation windows. For instance, model generator 152 may be configured to apply a curve-fitting algorithm to match the resistivity differences information with depth-dependent resistivity functions that associate depth-dependent laminate vertical and horizontal resistivities with depth differentials within a given evaluation window. As depicted and described in further detail with reference to FIG. 2, model generator 152 also includes components for generating formation tensor model that incorporate the depth-dependent laminate resistivity models for each of the evaluation windows. In some embodiments, the formation tensor models are generated based, at least in part, on depth-dependent laminate resistivity models that are utilized to determine depth-dependent vertical and horizontal resistivity components within individual evaluation windows. The depth-dependent laminate resistivity models are derived from the depth-associated resistivity data collected by resistivity tool 125 and from at least one other independent source of formation material properties information. The formation tensor model(s) can be executed using the depth-associated resistivity data collected by resistivity tool 125 to determine formation material properties such as sandstone resistivity and volumetric fractions of sandstone and laminate material such as shale.

Figure 2:
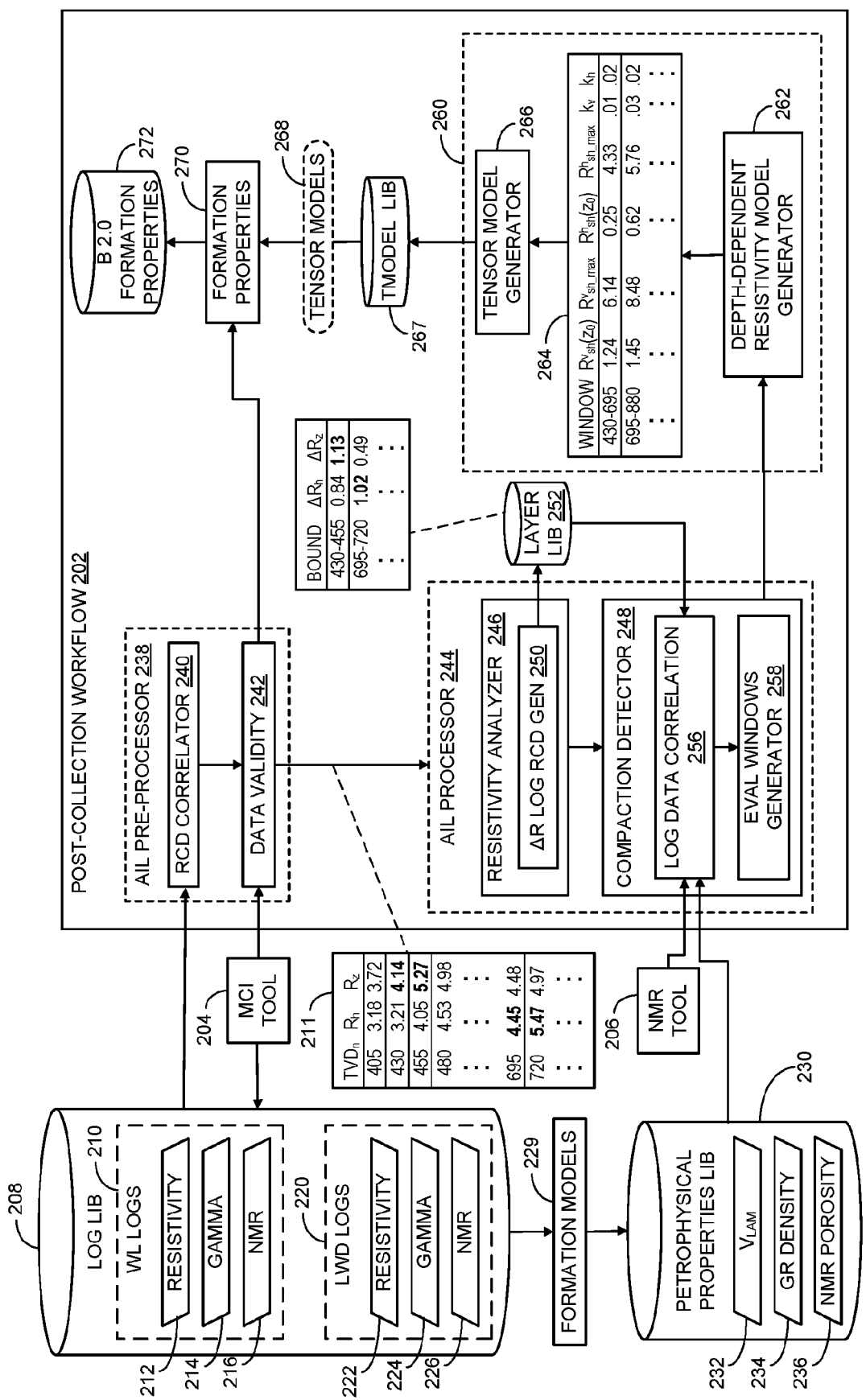
FIG. 2 is a block diagram illustrating the sub-systems, devices, and components of a formation test system in accordance with some embodiments.

FIG. 2 is a block diagram illustrating the sub-systems, devices, and components of a formation test system in accordance with some embodiments. The systems, subsystems, devices, and components depicted and described with reference to FIG. 2 may be implemented by the formation test system shown in FIG. 1. The formation test system includes a resistivity tool 204 that may be configured similarly to the resistivity tool configuration described and depicted in FIG. 1. Resistivity tool 204 is configured to measure and collect sets of triaxial resistivities at each of multiple borehole depths during an induction logging cycle. The induction logging results collected by resistivity tool 204 include sets of three-dimensional resistivity values associated with a measurement depth.

For a wireline logging cycle, the induction logging results are recorded as (apparent) resistivity data with resistivity logs 212 within a set of wireline logs 210 within a logging results library 208. For an LWD logging cycle, the induction logging results are also recorded as (apparent) resistivity data with resistivity logs 222 within a set of LWD logs 220 within logging results library 208. Logging results library 208 may also store records of other downhole logging measurements obtained from wireline and/or LWD cycles in which other logging tools such as gamma-ray and NMR logging tools. For instance, wireline logs 210 includes gamma ray logs 214 and NMR logs 216 and LWD logs 220 includes gamma radiation logs 224 and NMR logs 226. The logged resistivity, gamma radiation, and NMR measurements may be processed by post-processing properties modeling tools 229 to derive formation material properties, such as petrophysical properties, from the measurement data. Properties modeling tools 229 may process the resistivity data, including resistivity values and resistivity anisotropy, to derive depth-associated laminate material composition records such as depth-associated shale volumetric fraction records 232. Properties modeling tools 229 are further configured to derive, from the gamma and NMR measurements, material density information and material porosity information recorded as GR density records 234 and NMR porosity records 236.

The depicted formation test system further includes a formation properties system 202 that is configured, using any combination of hardware and software devices and components, to determine formation petrophysical properties based on the induction logging and other measurement data. Formation properties system 202 includes several formation modeling components including an AIL pre-processor 238, and AIL processor 244, and a model generator 260. Similar to AIL pre-processor 144 in FIG. 1, AIL pre-processor 238 is generally configured to prepare and filter measurement data received from logging results library 208 and/or directly received from resistivity tool 204 and/or other logging tools. AIL pre-processor 238 includes a record correlator 240 that is configured, using any combination of program instructions, to retrieve measurement records from either or both wireline logs 210 and LWD logs 220 such that different records (e.g., wireline and LWD) are associated based on measurement depth. Pre-processor 238 further includes a data validity component 242 to remove noise or other faulty results such as in the form of records having resistivity measurements that are outside of pre-specified threshold limits. For example, data validity component 242 may be configured to apply low-pass filtering to remove resistivity measurement values that have been distorted by high-frequency noise effects.

The depth-correlation and filtered measurement data is transmitted such as in the form of a resistivity data file 211 from AIL pre-processor 238 to AIL processor 244. The resistivity data recorded in file 211 is arranged in records that each associate a measurement depth in terms of TVD with a horizontal resistivity value and a vertical resistivity value. For example, the third mw-wise record associates a measurement depth of 480 depth units with a horizontal resistivity of 4.53 resistivity units (e.g., ohm·m). AIL processor 244 is configured to identify and correlate measured resistivity differentials with compaction-dependent material properties. AIL processor 244 includes a resistivity analyzer 246 that is configured, using any combination of program instructions, to identify differences among the depth-associated triaxial resistivities. For instance, resistivity analyzer 246 may be configured to compare differences between and among the measured resistivity values with a depth-dependent differential resistivity threshold.

In response to identifying a resistivity differential between at least two sets of measured resistivities that exceeds the threshold differential, a resistivity differential record generator 250 records the resistivity differential in a formation layer library 252. For example, resistivity differential record generator 250 may be programmed or otherwise configured to compare resistivity differentials with a threshold differential of 1.0 ohm·m. Record generator 250 reads and compares the differences between resistivities in the records within file 211 and determines that the resistivity differential $\Delta R=1.13$ between the vertical resistivity measured at 430 units, $R_z=4.14$, and the vertical resistivity measured at 455 units, $R_z=5.27$, exceeds the threshold. Similarly, record generator 250 determines that the resistivity differential $\Delta R=1.02$ between the horizontal resistivity measured at 695 units, $R_h=4.45$, and the horizontal resistivity measured at 720 units, $R_h=5.47$, exceeds the threshold. Record generator 250 records the determined resistivity differentials within a resistivity layer library 252. Resistivity layer library 252 includes multiple records that each associate the measurement depth boundary across which the resistivity differential is measured with the corresponding horizontal and vertical resistivity differentials. For example, the first row-wise record associates the measurement boundary specified as the range of depths between 430 and 455 units with the horizontal resistivity differential, $\Delta R_h=0.84$, as well as the vertical resistivity differential, $\Delta R_v=1.13$.

The resistivity differential records, such as those recorded in resistivity layer library 252 and/or those directly provided by resistivity analyzer 246 are received and processed by a compaction detector 248. Similar to compaction detection unit 148 in FIG. 1, compaction detector 248 is generally configured to determine compaction effects on material structural properties (e.g., density, porosity, etc.) that may be associated with the differences between the measured triaxial resistivity measurements such as those recorded by record generator 250. Compaction detector 248 may determine the compaction effects by correlating differences in the triaxial resistivity measurements with one or more compaction-dependent formation material properties determined for depths corresponding to the resistivity measurement depths. For instance, compaction detector 248 includes a log data correlator 256 that is configured, using any combination of program instructions, to correlate the triaxial resistivity differential data from resistivity analyzer 246 with non-induction logging measurement sourced data.

Log data correlator 256 receives log records containing measurement data collected by non-induction tools such as an NMR tool 206. The log records may also or alternatively be retrieved from petrophysical properties library 230. Log data correlator 256 is configured to match measurement depths and/or overlapping measurement depth ranges between the induction tool records and one or more non-induction tool records. Among the same depth and/or overlapping range records, log data correlator 256 is configured to determine correlations between changes in formation resistivity measured by the induction tool and one or more compaction-dependent properties of the formation materials as determined by other logging tools such as gamma radiation and/or NMR logging tools.

As part of the correlation process, log data correlator 256 identifies one or more of the boundary ranges specified by the records within resistance layer library 252 as having the same or overlapping measurement depths as non-induction measurements that indicate compaction of laminate material such as shale. For instance, log data correlator 256 may be configured to identify a pre-specified difference in porosity as determined by NMR porosity records 236 at a depth or depth range that fully or partially overlaps with the depth 430 or depth range 430-455 of the resistivity differential recorded in the first record within layer library 252. The identified boundary range information is transmitted from log data correlator 256 to an evaluation window generator component 258 within compaction detector 248.

Evaluation window generator 258 is configured, using any combination of program instructions, to select upper and/or lower depth values for one or more of the identified boundary ranges that will serve as evaluation window boundaries. For example, evaluation window generator 258 may select the upper depth 430 units of the identified range of 430-455 to be a boundary between two consecutive evaluation windows. By selecting the boundary depths, evaluation window generator 258 effectively determines a number of corresponding windows along a range of borehole depths that the resistivity tool 204 records sets of triaxial resistivities. In some embodiments, evaluation window generator 258 is further configured to determine laminate resistivity boundary values for each of the individual windows. For instance, evaluation window generator 258 may process laminate volumetric fraction data within records 232 to determine areas of high-laminate concentration within each of the windows.

Evaluation window generator 258 retrieves triaxial resistivity data, such as from resistivity data file 211 that corresponds in terms of measurement depth with the identified high-laminate concentration areas within the windows. From this corresponding resistivity data, evaluation window generator 258 determines a lower bound vertical resistivity and horizontal resistivity, or x, y, z resistivities for BA, for the laminate material. Assuming shale as the laminate material, the lower bound vertical shale resistivity may be represented as $R^v_{sh}(z_0)$ and corresponds to the value of vertical resistivity measured by resistivity tool 204 at a depth within a given evaluation window determined to have a high shale concentration (e.g., shale greater than 50%). The lower bound horizontal shale resistivity may be represented as $R^h_{sh}(z_0)$ and correspond to the value of horizontal resistivity measured by resistivity tool 204 at the depth within the evaluation window determined to have a high shale concentration.

Evaluation window generator 258 may also determine upper bound vertical resistivity and horizontal resistivity values for the laminate material. Assuming shale as the laminate material, the upper bound vertical shale resistivity may be represented as $R^v_{sh\_max}$ and corresponds to the value of vertical resistivity measured by resistivity tool 204 at a lowest depth within a given evaluation window determined to have a high shale concentration. The upper bound horizontal shale resistivity may be represented as $R^h_{sh\_max}$ and corresponds to the value of horizontal resistivity measured by resistivity tool 204 at the highest depth within the evaluation window determined to have a high shale concentration.

The evaluation window data including the window boundary depths and the lower and upper resistivity boundary values are transmitted from evaluation windows generator 258 to a depth-dependent resistivity model generator 262 within the overall model generator 260. Depth-dependent resistivity model generator 262 is configured to include components such as curve fit algorithms for fitting measured depth-associated resistivity values corresponding to high-laminate concentrations in each window with horizontal and vertical laminate resistivity functions. In some embodiments in which shale is the laminate, the horizontal laminate resistivity function may be expressed and mathematically implemented as:

$$R^h_{sh}(z) = R^h_{sh}(z_0) + [R^h_{sh\_max} - R^h_{sh}(z_0)][1 - \exp(-k_h(z - z_0))] \quad (1.1)$$

$$= R^h_{sh}(z_0)\left\{1 + \frac{R^h_{sh\_max} - R^h_{sh}(z_0)}{R^h_{sh}(z_0)}[1 - \exp(-k_h(z - z_0))]\right\}$$

with z representing the measurement depth (e.g., TVD), $R_{sh}{}^h(z)$ representing the shale horizontal resistivity at z, $R_{sh}{}^h(z_0)$ is the shale horizontal resistivity at $z_0$, $z_0 \geq z$ within the window, $R_{sh\_max}{}^h$ is the upper limit/bound of the shale horizontal resistivity within the window, and $k_h$ is an exponential constant ($k_h \geq 0$) for the shale horizontal resistivity. The values of $R^h_{sh}(z_0)$ and $R^h_{sh\_max}$ are constants that are determined for each window by evaluation windows generator 258 as described above. The exponent value $k_h$ is a correlation value that is determined based on the determined relation between laminate layer compaction and horizontal laminate resistivity. The correlation value $k_h$ is incorporated in the depth-dependent resistivity model represented by equation 1.1 to proportionately associate the measurement depth differential, $z-z_0$, with the depth-dependent laminate resistivity $R^h_{sh}(z)$.

The value of $k_h$ may be determined by depth-dependent resistivity model generator 262 by identifying a value of $k_h$ that results in a closest fit of a curve following the foregoing function with the shale horizontal resistivity data.

Figure 3B:
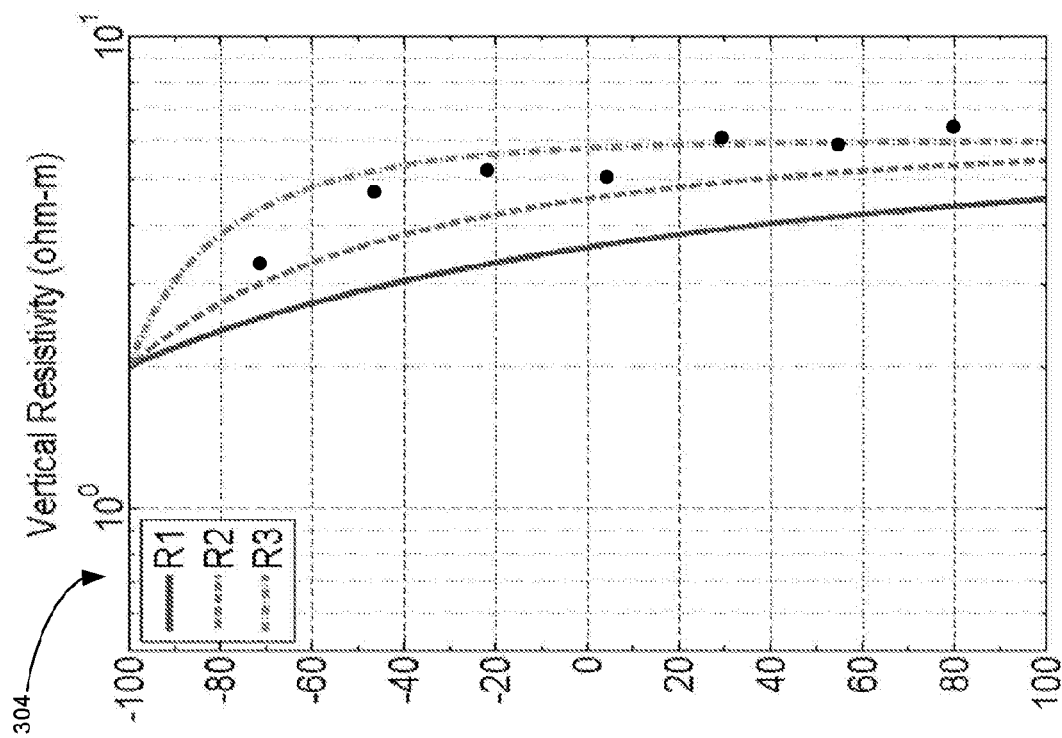
FIG. 3B is a diagram depicting depth-dependent shale vertical resistivity data that may be generated by and applied to formation modeling in accordance with some embodiments.
Figure 3A:
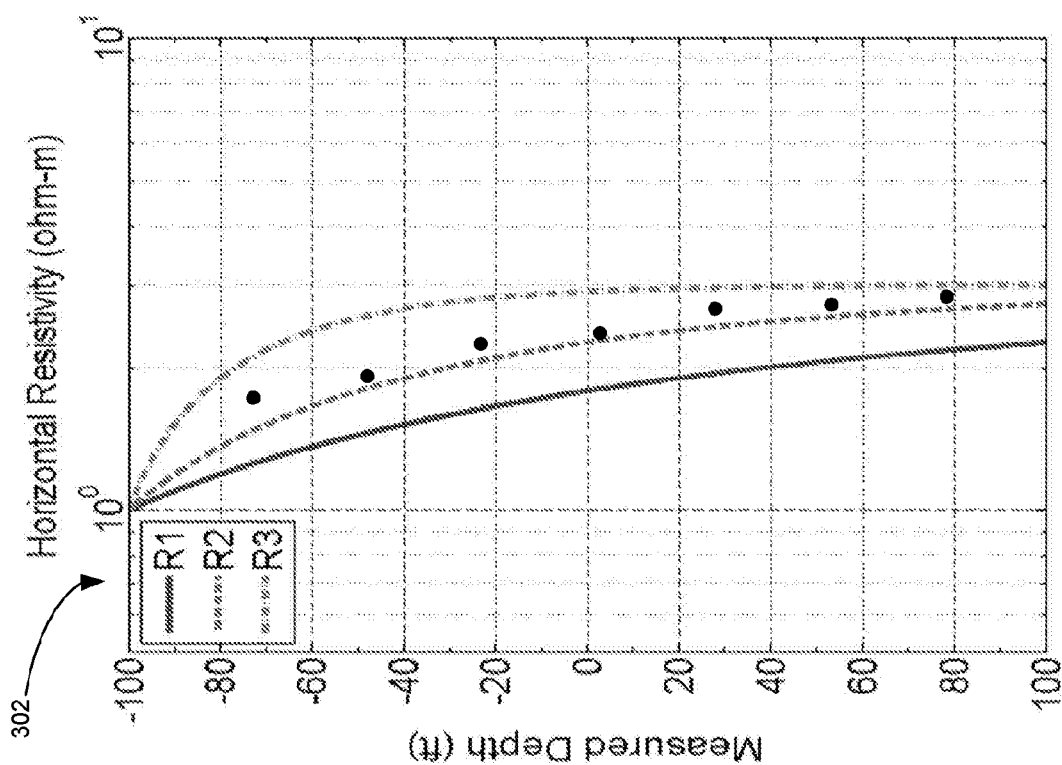
FIG. 3A is a diagram depicting depth-dependent shale horizontal resistivity data that may be generated by and applied to formation modeling in accordance with some embodiments.

FIG. 3A illustrates simulated shale horizontal resistivity curves generated using equation 1.1 with three different values for $k_h$. The R1 curve is generated using the determined constants for $R^h_{sh}(z_0)$ and $R^h_{sh\_max}$ and a value of $k_h$=0.005. The R2 curve is generated using the determined constants for $R^h_{sh}(z_0)$ and $R^h_{sh\_max}$ and a value of $k_h$=0.01. The R2 curve is generated using the determined constants for $R^h_{sh}(z_0)$ and $R^h_{sh\_max}$ and a value of $k_h$=0.03. Multiple horizontal resistivity measurements that are correlated to depths at which the shale concentrations are high are represented as circular dots superimposed on the graph. As shown, the shale-correlated horizontal resistivity values are collectively a nearest match to the R2 curve. In this instance, a $k_h$ value of 0.01 would therefore be selected to be included in the depth-dependent resistivity model for this particular evaluation window.

For the embodiments in which shale is the laminate, the vertical laminate resistivity function may be expressed and implemented as:

$$R_{sh}^v(z) = R_{sh}^v(z_0) + [R_{sh\_max}^v - R_{sh}^v(z_0)][1 - \exp(-k_v(z - z_0))] \quad (1.2)$$

$$= R_{sh}^v(z_0)\left\{1 + \frac{R_{sh\_max}^v - R_{sh}^v(z_0)}{R_{sh}^v(z_0)}[1 - \exp(-k_v(z - z_0))]\right\}$$

with z representing the measurement depth (e.g., TVD), $R_{sh}^v(z)$ representing the shale horizontal resistivity at z, $R_{sh}^v(z_0)$ is the shale horizontal resistivity at $z_0$, $z_0 \geq z$ within the window, $R_{sh\_max}^v$ is the upper limit/bound of the shale horizontal resistivity within the window, and $k_v$ is an exponential constant ($k_v \geq 0$) for the shale horizontal resistivity. The values of $R_{sh}^v(z_0)$ and $R_{sh}^v$ are constants that are determined for each window by evaluation windows generator 258 as described above. The exponent value $k_v$ is a correlation value that is determined based on the determined relation between laminate layer compaction and vertical laminate resistivity. The correlation value $k_v$ is incorporated in the depth-dependent resistivity model represented by equation 1.2 to proportionately associate the measurement depth differential, $z-z_0$, with the depth-dependent laminate resistivity $R_{sh}^v(z)$. The value of $k_v$ may be determined by depth-dependent resistivity model generator 262 by identifying a value of $k_v$ that results in a closest fit of a curve following the foregoing function with the shale vertical resistivity data.

FIG. 3B illustrates simulated shale vertical resistivity curves generated using equation 1.2 with three different values for $k_v$. The R1 curve is generated using the determined constants for $R_{sh}^v(z_0)$ and $R_{sh\_max}^v$ and a value of $k_v$=0.005. The R2 curve is generated using the determined constants for $R_{sh}^v(z_0)$ and $R_{sh\_max}^v$ and a value of $k_v$=0.01. The R2 curve is generated using the determined constants for $R_{sh}^v(z_0)$ and $R_{sh\_max}^v$ and a value of $k_v$=0.03. Multiple vertical resistivity measurements that are correlated with depths at which the shale concentrations are high are represented as circular dots superimposed on the graph. As shown, the shale-correlated vertical resistivity values are collectively a nearest match to the R3 curve. In this instance, a $k_h$ value of 0.03 would therefore be selected to be included in the depth-dependent resistivity model for the individual evaluation window.

In the foregoing manner, depth-dependent resistivity model generator 262 generates multiple depth-dependent laminate resistivity models, each corresponding to a respective evaluation window. The models may be recorded in a models library 264 in which each depth-dependent evaluation window model is represented as a record that associates a window depth range with values for $R_{sh}^v(z_0)$, $R_{sh\_max}^v$, $R_{sh}^h(z_0)$, $R_{sh\_max}^h$, $k_v$, and $k_h$. The depth range for each evaluation window is bounded by an upper and lower depth boundary such as the upper boundary of 430 units and lower boundary of 695 units for the first row-wise record within models library 264.

The depth-dependent models information is received and processed by a tensor model generator 266. In one aspect, tensor model generator 266 is configured to determine the laminate horizontal and vertical resistivity values as a function of depth for each of the evaluation windows. In some embodiments in which the laminate is shale, tensor model generator 266 determines the depth-dependent horizontal resistivity values by executing an algorithm implementing equation 1.1 for each of the evaluation windows. Tensor model generator 266 determines the depth-dependent vertical resistivity values by executing an algorithm implementing equation 1.2 for each of the evaluation windows. Having determined the depth-dependent shale horizontal and vertical resistivities, tensor model generator 266 incorporates the determine shale resistance values into a formation tensor model that uses measured resistivity values to determine formation properties such as volumetric fractions of sandstone and sandstone resistivity.

Tensor model generator 266 generates a first tensor model that associates measured horizontal resistivities with formation petrophysical properties and a second tensor model that associates measured vertical resistivities with formation petrophysical properties. For embodiments in which shale is the laminate, the first tensor model may be represented and mathematically implemented by the following equation:

$$\frac{1}{R_h} = C_h = \frac{(1 - V_{lam})}{R_{sd}} + \frac{V_{lam}}{R_{sh}^b(z)} \quad (2.1)$$

with $R_h$ representing measured horizontal resistivity, Ch representing horizontal conductivity, $V_{lam}$ representing volumetric fraction of shale, R representing sandstone resistivity, and $R_{sh}^h(z)$ representing the incorporated depth-dependent shale laminate horizontal resistivity model.

For embodiments in which shale is the laminate, the second tensor model may be represented and implemented by the following equation:

$$R_v = (1 - V_{lam}) \cdot R_{sd} + V_{lam} \cdot R_{sh}^v(z) = (1 - V_{lam}) \cdot R_{sd} + V_{lam} \cdot R_{sh}^{vh}(z) \cdot R_{sh}^h(z) \quad (2.2)$$

with $R_v$ representing measured vertical resistivity, $V_{lam}$ representing volumetric fraction of shale, $R_{sd}$ representing sandstone resistivity, and $R_{sh}^v(z)$ representing the incorporated depth-dependent laminate vertical resistivity model.

The tensor models may be recorded in a tensor model library 267 from which they may be retrieved as executable program components 268 comprising algorithms that implement equations 2.1 and 2.2. In some embodiments, program components 268 may directly incorporate the depth-dependent laminate horizontal and vertical algorithms with the model/evaluation window data such that the depth-dependent laminate horizontal and vertical resistivities are computed during execution of program components 268 by a formation properties unit 270. Formations properties unit 270 executes the first and second tensor models as a system of equations that includes the formation volumetric relation vlam+vsd=1 to solve for the unknown values of $R_{sd}$ and $v_{lam}$ and records the formation properties in a formation properties database 272. As inputs for the values of $R_h$ and $R_v$, formation properties unit 270 receives the measured triaxial resistivity information from AIL pre-processor 238.

Figure 4:
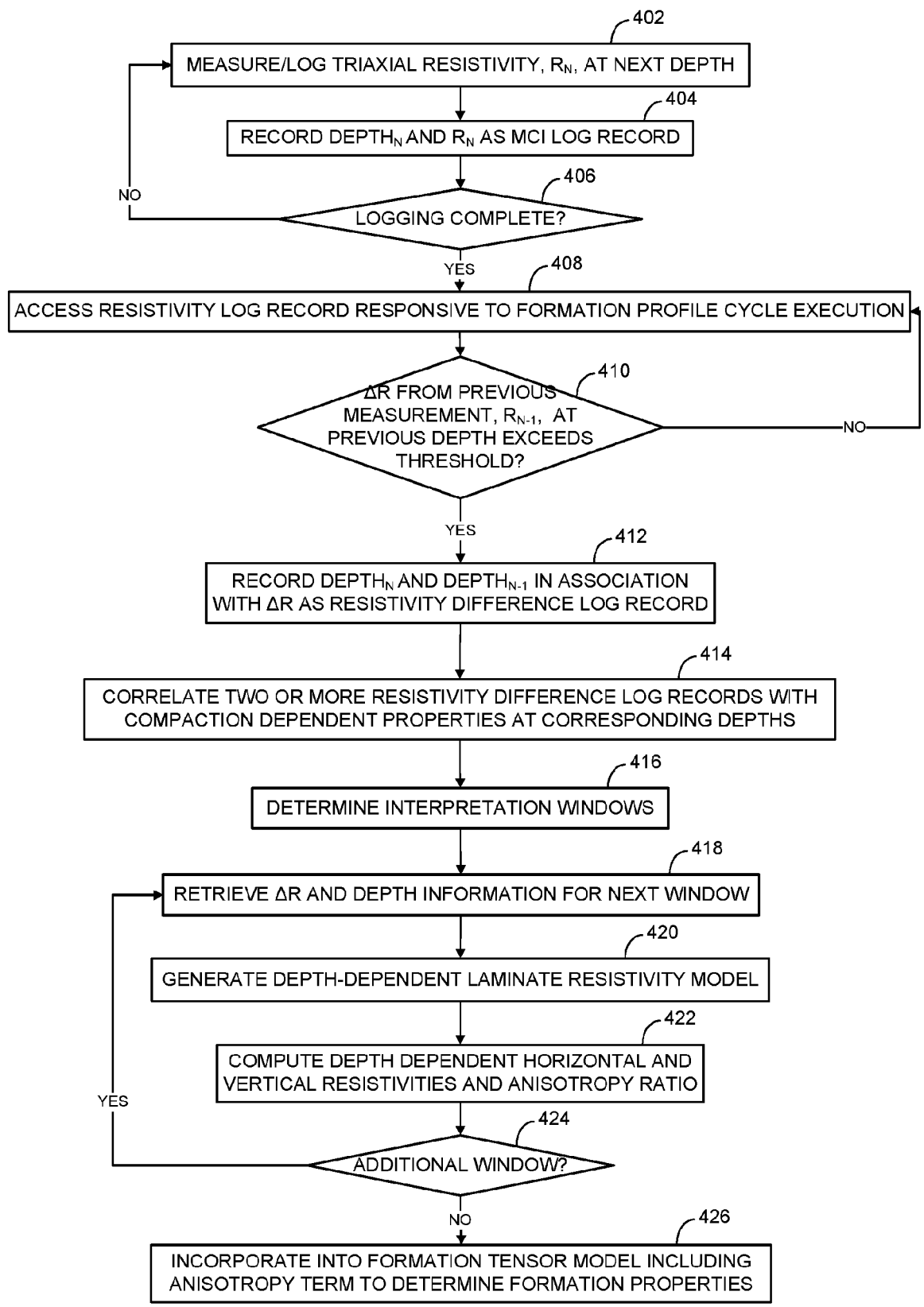
FIG. 4 is a flow diagram illustrating operations and functions for determining formation properties in a manner that accounts for laminate layer compaction in accordance with some embodiments.

FIG. 4 is a flow diagram illustrating operations and functions for determining formation properties in a manner that accounts for laminate layer compaction in accordance with some embodiments. The operations and function depicted and described with reference to FIG. 4 may be implemented by any combination of the systems, subsystems, devices, and components depicted and described with reference to FIGS. 1-3. The process begins as shown at block 402 with an resistivity tool measuring a set of triaxial resistivities at a next measurement depth. In some embodiments, the measurement depths may be relatively distinct borehole positions and in other embodiments the resistivity tool may measure resistivities in a relatively continuous manner progressing along the length of the borehole. At block 404, the resistivity tool and/or post-processing tools record the measurement depth in association with the set of triaxial resistivities within a next induction logging record.

A formation profile cycle begins as shown at block 408 with a formation properties unit reading resistivity log records, such as MCI log records, to obtain triaxial resistivity measurement data collected at multiple borehole depths. In some embodiments, the resistivity measurement data is depth-correlated and filtered by an AIL pre-processor and processed by a resistivity analyzer to determine significant resistivity differentials. As shown at inquiry block 410, the resistivity analyzer determines whether a resistivity differential exceeds a threshold differential value. If so, the resistivity analyzer records the measurement depths between which the resistivity differential occurs in association with the resistivity differential value in respective resistivity differential records (block 412).

At block 414, a compaction detector correlates the resistivity differential information with compaction-dependent material properties that are determined using other logging tools such as NMR and gamma radiation logging tools. The resistivity differential information includes the magnitudes of the resistivity differential values and the depth ranges in which the differentials were detected. The compaction dependent material properties may include petrophysical structure properties such as porosities and densities. For instance, the compaction dependent properties may include porosity determined based on NMR measurements and density determined based on gamma radiation measurements. The resistivity differential information is compared with the compaction dependent material properties at the same or overlapping depths to determine the measurement depths and/or depth ranges at which differential resistivities coincide with regions of high laminate concentration that have been structurally modified by compaction as evidenced by the compaction dependent properties. In some embodiments, the resistivity differential values may include the resistivity values from which the differentials are determined. In such cases, one or more petrophysical structure properties may be determined based on the resistivities and resistivity differentials and compared with the compaction dependent petrophysical structure properties. In this manner, a depth-dependent relation is determined between laminate layer compaction and the vertical or horizontal formation resistivity values.

At block 416, the compaction detector divides all or a portion of the range of borehole depths over which resistivity measurements, such as MCI measurements, were collected into a number of resistivity evaluation windows having defined upper and lower depth boundaries. The process for generating a depth-dependent laminate resistivity model for a next of the evaluation windows begins at block 418 with a depth-dependent model generator receiving and processing laminate resistivity information and associated measurement depths. At block 420 the depth-dependent resistivity model generator applies a curve fitting algorithm to determine correlation coefficients $k_h$ and $k_v$ that provide a closed match to the measured laminate resistivity values within the window. At block 422 a tensor model generator executes the depth-dependent resistivity model using the determined correlation coefficients to determine the values of horizontal and vertical laminate resistivities that incorporate depth-dependent compaction. If another evaluation window remains to be processed as shown at block 424, control returns to block 418. Otherwise, when the models for each evaluation window have been processed, a formation properties unit executes the formation tensor models that incorporate the depth-dependent laminate resistivity models directly or indirectly by processing the laminate resistivity values that account for depth compaction effects (block 426).

FIG. 5 shows a suitable context for describing the operation of the disclosed systems and methods. In the illustrated logging while drilling VOID) environment, a drilling platform 502 is equipped with a derrick 504 that supports a hoist 506 for raising and lowering a drill string 508. The hoist 506 suspends a top drive 510 that rotates the drill string 508 as it is lowered through the well head 512. The drill string 508 can be extended by temporarily anchoring the drill string 508 at the well head 512 and using the hoist 506 to position and attach new drill pipe sections with threaded connectors 507.

Connected to the lower end of the drill string 508 is a drill bit 514. As bit 514 rotates, it creates a borehole 520 that passes through various formations 521. A pump 516 circulates drilling fluid through a supply pipe 518 to top drive 510, through the interior of drill string 508, through orifices in drill bit 514, back to the surface via the annulus around drill string 508, and into a retention pit 524. The drilling fluid transports cuttings from the borehole 520 into the pit 524 and aids in maintaining the integrity of the borehole 520.

An resistivity logging tool 526 is integrated into a bottomhole assembly 529 near the bit 514. The resistivity logging tool 526 may take the form of a drill collar, i.e., a thick-walled tubular that provides weight and rigidity to aid the drilling process. As the bit extends the borehole 520 through the formations, the bottom hole assembly (BHA) 529 collects multi-component induction measurements (using tool 526) as well as measurements of the tool orientation and position, borehole size, drilling fluid resistivity, and various other drilling conditions.

In wells employing acoustic telemetry for LWD, downhole sensors (including resistivity logging tool 526) are coupled to a telemetry module 528 having an acoustic telemetry transmitter that transmits telemetry signals in the form of acoustic vibrations in the tubing wall of dill string 508. An acoustic telemetry receiver army 530 may be coupled to tubing below the top drive 510 to receive transmitted telemetry signals. One or more repeater modules 532 may be optionally provided along the chill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the BHA 529, thereby enabling adjustment of the configuration and operating parameters of resistivity logging tool 526. In some embodiments, the telemetry module 528 also or alternatively stores measurements for later retrieval when the BHA 529 realms to the surface.

At various times during the drilling process, the drill string 508 is removed from the borehole 520 as shown in FIG. 6. Once the drill string has been removed, logging operations can be conducted using a wireline logging tool 534, i.e., a sensing instalment sonde suspended by a cable 542 having conductors for transporting power to the tool 534 and communications from the tool 534 to the surface. An resistivity logging portion of the wireline logging tool 534 may have centralizing arms 536 that center the tool 534 within the borehole 520 as the tool 534 is pulled uphole. A logging facility 544 collects measurements from the wireline logging tool 534, and includes computing facilities 545 for processing mid storing the measurements gathered by the wireline logging tool 534.

Example Computer

Figure 7:
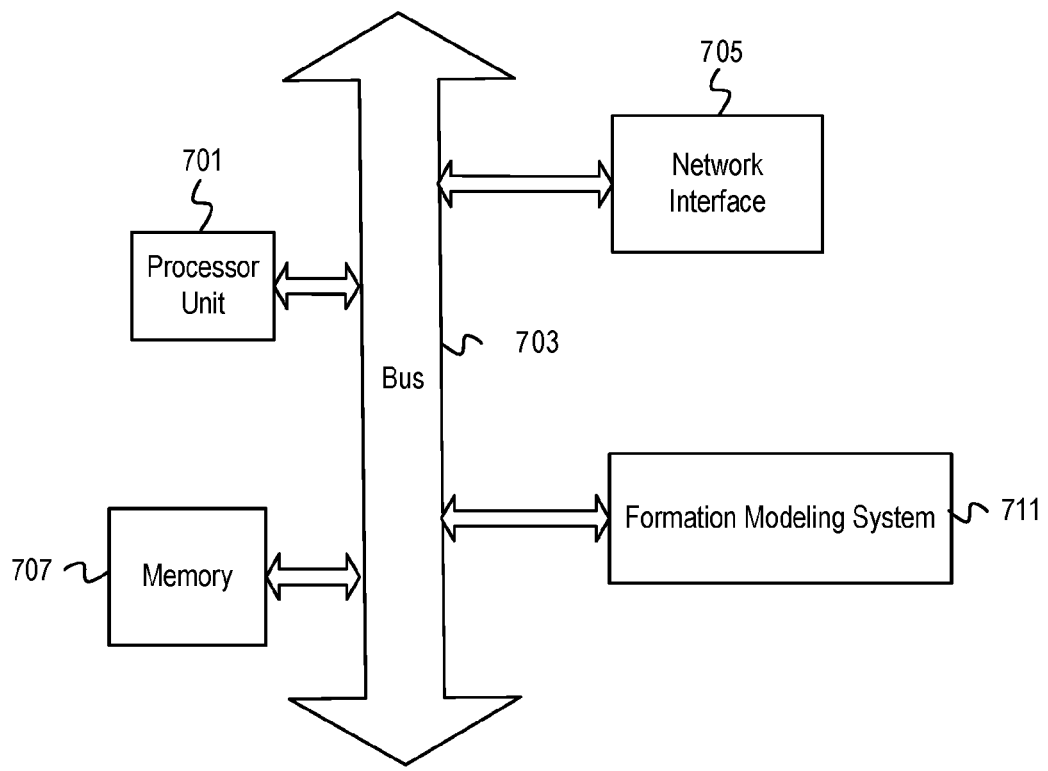
FIG. 7 is a block diagram depicting an example computer system that may be utilized to implement a formation evaluation system in accordance with some embodiments.

FIG. 7 depicts an example computer, according to some embodiments. The computer system includes a processor 701 (possibly including multiple processors, multiple cores, multiple nodes, and/or implementing multi-threading, etc.). The computer system includes a memory 707. The memory 707 may be system memory (e.g., one or more of cache, SRAM, DRAM, eDRAM, DDR RAM, EEPROM, NRAM, RRAM, etc.) or any one or more of the above already described possible realizations of machine-readable media. The computer system also includes a bus 703 (e.g., PCI, ISA, PCI-Express, etc.) and a network interface 705 (e.g., a Fiber Channel interface, an Ethernet interface, wireless interface, etc.).

The system also includes a formation modeling system 711, which may be hardware, software, firmware, or a combination thereof. For example, the formation modeling system 711 may comprise instructions executable by the processor 701. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. The formation modeling system 711 profiles properties of a formation using by generating depth-dependent laminate resistivity models for multiple evaluation windows in the manner described above. Additional realizations may include fewer or more components not expressly illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Variations

While the aspects of the disclosure are described with reference to various implementations, these aspects are illustrative and the scope of the claims is not limited thereto. In general, techniques for determining formation properties as described herein may be implemented with facilities consistent with any hardware system or hardware systems. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. The operations may be performed in parallel and/or in a different order. Each block of the flowchart illustrations and/or block diagrams, and combinations of blocks in the flowchart illustrations and/or block diagrams, can be implemented by program code provided to a processor of a general purpose computer, special purpose computer, or other programmable machine or apparatus.

Aspects of the disclosure may be embodied as a system, method or program code/instructions stored in one or more machine-readable media. Aspects may take the form of hardware, software, or a combination of software and hardware aspects that may all generally be referred to herein as a "circuit," "module" or "system." The machine readable medium may be a machine readable signal medium or a machine readable storage medium. A machine readable storage medium may be, for example, but not limited to, a system, apparatus, or device, that employs any one of or combination of, for example, electronic, magnetic, or optical, or semiconductor technology to store program code. More specific examples of the machine readable storage medium would include the following: a magnetic or optical media disk, a random access memory, a read-only memory, an erasable programmable read-only memory, a portable compact disc read-only memory, an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device. Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language; and conventional procedural programming languages. The program code may execute entirely on a stand-alone machine, may execute in a distributed manner across multiple machines, and may execute on one machine while providing results and or accepting input on another machine. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks. Use of the phrase "at least one of" preceding a list with the conjunction "and" should not be treated as an exclusive list and should not be construed as a list of categories with one item from each category, unless specifically stated otherwise.

Example Embodiments

Embodiment 1

A method comprising: measuring, using a resistivity tool, a set of triaxial resistivities at each of a plurality of borehole depths; correlating differences among the sets of triaxial resistivities with a compaction-dependent property determined for one or more borehole depths; generating a depth-dependent laminate resistivity model based on said correlating; and determining a formation property by processing the sets of triaxial resistivities using a formation tensor model that incorporates the depth-dependent laminate resistivity model, wherein said correlating includes determining a depth-dependent relation between laminate layer compaction and vertical or horizontal formation resistivity by comparing the compaction-dependent property determined for the one or more borehole depths with differences among the one or more of the sets of triaxial resistivities. Embodiment 1 may further comprise determining a correlation value based on the determined relation between laminate layer compaction and vertical or horizontal formation resistivity; and incorporating the correlation value within the depth-dependent resistivity model to proportionately associate a measurement depth differential and a depth-dependent laminate resistivity. Some embodiments may further comprise determining the compaction dependent property as a first petrophysical structure property value, and wherein said correlating incudes comparing the first petrophysical structure value with a second petrophysical structure value determined based on differences among the sets of triaxial resistivities. Embodiment 1 may further comprise measuring a second set of triaxial resistivities at each of a plurality of borehole depths; and processing the second set of triaxial resistivities using the formation tensor model to determine formation properties. In Embodiment 1, said generating a depth-dependent laminate resistivity model may include determining a number of evaluation windows within a range of borehole depths over which the sets of triaxial resistivities are measured; and generating a respective depth-dependent laminate resistivity model for each of the evaluation windows. In Embodiment 1, said generating a depth-dependent laminate resistivity model may comprise, for each of at least one of the evaluation windows, generating a depth-dependent horizontal resistivity model having a first exponent value that proportionately correlates a depth differential within the evaluation window with a depth-dependent horizontal laminate resistivity; and generating a depth-dependent vertical resistivity model having a second exponent value that proportionately correlates the depth differential within the evaluation window with a depth-dependent vertical laminate resistivity. In Embodiment 1, the depth differential in the depth-dependent laminate resistivity model may comprises a difference between an upper boundary depth of the evaluation window and a resistivity measurement depth within the evaluation window. In Embodiment 1, said generating a depth-dependent laminate resistivity model may comprise selecting the first and second exponent values for each evaluation window based on said correlating differences among the sets of triaxial resistivities with the compaction-dependent property. In Embodiment 1, the formation tensor model may associate a formation vertical resistivity with a ratio between the depth-dependent vertical shale resistivity and the depth-dependent horizontal shale resistivity. Embodiment 1 may further comprise determining different values for the first and second exponents for each of the evaluation windows.

Embodiment 2

A system comprising: a resistivity tool configured to measure a set of triaxial resistivities at each of a plurality of borehole depths; and a measurement processing system communicatively coupled to the resistivity tool, said measurement processing system comprising: a processor; and a machine-readable medium having program code executable by the processor to cause the system to, correlate differences among the sets of triaxial resistivities with a compaction-dependent property determined for one or more borehole depths; generate a depth-dependent laminate resistivity model based on said correlating; and determine a formation property by processing the sets of triaxial resistivities using a formation tensor model that incorporates the depth-dependent laminate resistivity model. In Embodiment 2, the resistivity tool may be a multi-component induction tool and the program code may cause the system to correlate differences includes program code executable by the processor to cause the system to determine a depth-dependent relation between laminate layer compaction and vertical or horizontal formation resistivity by comparing the compaction-dependent property determined for the one or more borehole depths with differences among the one or more of the sets of triaxial resistivities. In Embodiment 2, the program code may further comprise program code executable by the processor to cause the system to: determine a correlation value based on the determined relation between laminate layer compaction and vertical or horizontal formation resistivity; and incorporate the correlation value within the depth-dependent resistivity model to proportionately associate a measurement depth differential and a depth-dependent laminate resistivity. In Embodiment 2, the program code may further comprise program code executable by the processor to cause the system to determine the compaction dependent property as a first petrophysical structure property value, and wherein the program code to cause the system to correlate differences incudes program code executable by the processor to cause the system to compare the first petrophysical structure value with a second petrophysical structure value determined based on differences among the sets of triaxial resistivities. In Embodiment 2, the program code may further comprise program code executable by the processor to cause the system to: measure a second set of triaxial resistivities at each of a plurality of borehole depths; and process the second set of triaxial resistivities using the formation tensor model to determine formation properties. In Embodiment 2, the program code to cause the system to generate a depth-dependent laminate resistivity model may include program code executable by the processor to cause the system to: determine a number of evaluation windows within a range of borehole depths over which the sets of triaxial resistivities are measured; and generate a respective depth-dependent laminate resistivity model for each of the evaluation windows. In Embodiment 2, the program code to cause the system to generate a depth-dependent laminate resistivity model may comprise program code executable by the processor to cause the system to: for each of at least one of the evaluation windows, generate a depth-dependent horizontal resistivity model having a first exponent value that proportionately correlates a depth differential within the evaluation window with a depth-dependent horizontal laminate resistivity; and generate a depth-dependent vertical resistivity model having a second exponent value that proportionately correlates the depth differential within the evaluation window with a depth-dependent vertical laminate resistivity.

Embodiment 3

An apparatus comprising: a processor configured to receive sets of triaxial resistivities measured by a resistivity tool at each of a plurality of borehole depths; and a machine-readable medium having program code executable by the processor to cause the apparatus to, correlate differences among the sets of triaxial resistivities with a compaction-dependent property determined for one or more borehole depths, wherein said correlating includes determining a depth-dependent relation between laminate layer compaction and vertical or horizontal formation resistivity by comparing the compaction-dependent property determined for the one or more borehole depths with differences among the one or more of the sets of triaxial resistivities; generate a depth-dependent laminate resistivity model based on said correlating; and determine a formation property by processing the sets of triaxial resistivities using a formation tensor model that incorporates the depth-dependent laminate resistivity model. In Embodiment 3, the program code may further comprise program code executable by the processor to cause the apparatus to: determine a correlation value based on the determined relation between laminate layer compaction and vertical or horizontal formation resistivity; and incorporate the correlation value within the depth-dependent resistivity model to proportionately associate a measurement depth differential and a depth-dependent laminate resistivity.

What is claimed is:

1. A method for determining formation properties comprising:
   deploying a resistivity tool into a borehole of a formation, wherein the resistivity tool comprises a transmitter and a receiver;
   transmitting, by the transmitter, a first signal;
   receiving, with the receiver, a second signal, wherein the second signal is induced by the first signal in the formation;
   measuring, using the resistivity tool, a set of triaxial resistivities at each of a plurality of borehole depths, wherein the set of triaxial resistivities are based, at least in part, on the second signal;
   correlating differences among the sets of triaxial resistivities with a compaction-dependent property determined for one or more borehole depths;
   generating a depth-dependent laminate resistivity model based on said correlating;
   determining a formation property by processing the sets of triaxial resistivities using a formation tensor model that incorporates the depth-dependent laminate resistivity model; and
   determining a presence of hydrocarbons in the formation based, at least in part, on the formation property.

2. The method of claim 1, wherein said correlating includes determining a depth-dependent relation between laminate layer compaction and vertical or horizontal formation resistivity by comparing the compaction-dependent property determined for the one or more borehole depths with differences among the one or more of the sets of triaxial resistivities.

3. The method of claim 2, further comprising:
   determining a correlation value based on the depth-dependent relation between laminate layer compaction and vertical or horizontal formation resistivity; and
   incorporating the correlation value within the depth-dependent laminate resistivity model to proportionately associate a measurement depth differential and a depth-dependent laminate resistivity.

4. The method of claim 1, further comprising determining the compaction-dependent property as a first petrophysical structure property value, and wherein said correlating incudes comparing the first petrophysical structure property value with a second petrophysical structure value determined based on differences among the sets of triaxial resistivities.

5. The method of claim 1, further comprising:
   measuring a second set of triaxial resistivities at each of the plurality of borehole depths; and
   processing the second set of triaxial resistivities using the formation tensor model to determine formation properties.

6. The method of claim 1, wherein said generating the depth-dependent laminate resistivity model includes:
   determining a number of evaluation windows within a range of borehole depths over which the sets of triaxial resistivities are measured; and
   generating a respective depth-dependent laminate resistivity model for each of the evaluation windows.

7. The method of claim 6, wherein said generating the depth-dependent laminate resistivity model comprises:
   for each of at least one of the evaluation windows,
      generating a depth-dependent horizontal resistivity model having a first exponent value that proportionately correlates a depth differential within the evaluation window with a depth-dependent horizontal laminate resistivity; and
      generating a depth-dependent vertical resistivity model having a second exponent value that proportionately correlates the depth differential within the evaluation window with a depth-dependent vertical laminate resistivity.

8. The method of claim 7, wherein the depth differential in the depth-dependent laminate resistivity model comprises a difference between an upper boundary depth of the evaluation window and a resistivity measurement depth within the evaluation window.

9. The method of claim 7, wherein said generating the depth-dependent laminate resistivity model comprises selecting the first and second exponent values for each evaluation window based on said correlating differences among the sets of triaxial resistivities with the compaction-dependent property.

10. The method of claim 7, wherein the formation tensor model associates a formation vertical resistivity with a ratio between depth-dependent vertical shale resistivity and depth-dependent horizontal shale resistivity.

11. The method of claim 7, further comprising determining different values for the first and second exponents for each of the evaluation windows.

12. A system for determining formation properties comprising:
   a resistivity tool in a borehole of a formation, the resistivity tool having a transmitter that transmits a first signal and a receiver that receives a second signal, wherein the second signal is induced by the first signal in the formation, wherein the resistivity tool is configured to measure a set of triaxial resistivities at each of a plurality of borehole depths, and wherein the set of triaxial resistivities are based, at least in part, on the second signal; and
   a measurement processing system communicatively coupled to the resistivity tool, said measurement processing system comprising:

a processor; and a machine-readable medium having program code executable by the processor to cause the system to, correlate differences among the sets of triaxial resistivities with a compaction-dependent property determined for one or more borehole depths;

generate a depth-dependent laminate resistivity model based on said correlating;

determine a formation property by processing the sets of triaxial resistivities using a formation tensor model that incorporates the depth-dependent laminate resistivity model; and determine a presence of hydrocarbons in the formation based, at least in part, on the formation property.

13. The system of claim 12, wherein the resistivity tool is a multi-component induction tool.

14. The system of claim 12, wherein the program code to cause the system to correlate differences includes program code executable by the processor to cause the system to determine a depth-dependent relation between laminate layer compaction and vertical or horizontal formation resistivity by comparing the compaction-dependent property determined for the one or more borehole depths with differences among the one or more of the sets of triaxial resistivities.

15. The system of claim 14, wherein the program code further comprises program code executable by the processor to cause the system to:

determine a correlation value based on the depth-dependent relation between laminate layer compaction and vertical or horizontal formation resistivity; and incorporate the correlation value within the depth-dependent laminate resistivity model to proportionately associate a measurement depth differential and a depth-dependent laminate resistivity.

16. The system of claim 12, wherein the program code further comprises program code executable by the processor to cause the system to:

measure a second set of triaxial resistivities at each of the plurality of borehole depths; and process the second set of triaxial resistivities using the formation tensor model to determine formation properties.

17. The system of claim 12, wherein the program code to cause the system to generate the depth-dependent laminate resistivity model includes program code executable by the processor to cause the system to:

determine a number of evaluation windows within a range of borehole depths over which the sets of triaxial resistivities are measured; and generate a respective depth-dependent laminate resistivity model for each of the evaluation windows.

18. The system of claim 17, wherein the program code to cause the system to generate the depth-dependent laminate resistivity model comprises program code executable by the processor to cause the system to:

for each of at least one of the evaluation windows, generate a depth-dependent horizontal resistivity model having a first exponent value that proportionately correlates a depth differential within the evaluation window with a depth-dependent horizontal laminate resistivity; and generate a depth-dependent vertical resistivity model having a second exponent value that proportionately correlates the depth differential within the evaluation window with a depth-dependent vertical laminate resistivity.

19. An apparatus for determining formation properties comprising:

a processor configured to receive sets of triaxial resistivities measured by a resistivity tool at each of a plurality of borehole depths in a formation, the resistivity tool having a transmitter that transmits a first signal and a receiver that receives a second signal, wherein the second signal is induced by the first signal in the formation, wherein the resistivity tool is configured to measure sets of triaxial resistivities at each of the plurality of borehole depths, and wherein the sets of triaxial resistivities are based, at least in part, on the second signal; and a machine-readable medium having program code executable by the processor to cause the apparatus to, correlate differences among the sets of triaxial resistivities with a compaction-dependent property determined for one or more borehole depths, wherein said correlating includes determining a depth-dependent relation between laminate layer compaction and vertical or horizontal formation resistivity by comparing the compaction-dependent property determined for the one or more borehole depths with differences among the one or more of the sets of triaxial resistivities;

generate a depth-dependent laminate resistivity model based on said correlating;

determine a formation property by processing the sets of triaxial resistivities using a formation tensor model that incorporates the depth-dependent laminate resistivity model; and determine a presence of hydrocarbons in the formation based, at least in part, on the formation property.

20. The apparatus of claim 19, wherein the program code further comprises program code executable by the processor to cause the apparatus to:

determine a correlation value based on the depth-dependent relation between laminate layer compaction and vertical or horizontal formation resistivity; and incorporate the correlation value within the depth-dependent laminate resistivity model to proportionately associate a measurement depth differential and a depth-dependent laminate resistivity.

* * * * *